US008042739B2

(12) United States Patent
Woodard et al.

(10) Patent No.: US 8,042,739 B2
(45) Date of Patent: *Oct. 25, 2011

(54) WIRELESS TAMPER DETECTION SENSOR AND SENSING SYSTEM

(75) Inventors: Stanley E. Woodard, Hampton, VA (US); Bryant D. Taylor, Smithfield, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 772 days.

This patent is subject to a terminal disclaimer.

(21) Appl. No.: 11/864,012

(22) Filed: Sep. 28, 2007

(65) Prior Publication Data

US 2009/0302111 A1 Dec. 10, 2009

(51) Int. Cl.
*G06K 19/00* (2006.01)

(52) U.S. Cl. .......................... 235/449; 235/435; 235/439

(58) Field of Classification Search .................. 235/435, 235/439, 449, 450, 487, 492
See application file for complete search history.

(56) References Cited

U.S. PATENT DOCUMENTS

| | | | | |
|---|---|---|---|---|
| 4,626,311 | A * | 12/1986 | Taylor | 156/308.2 |
| 5,049,704 | A | 9/1991 | Matouschek | |
| 5,285,734 | A | 2/1994 | MacPherson | |
| 5,506,566 | A | 4/1996 | Oldfield | |
| 5,541,577 | A | 7/1996 | Cooper et al. | |
| 5,675,319 | A | 10/1997 | Rivenbert et al. | |
| 5,705,981 | A | 1/1998 | Goldman | |
| 6,050,622 | A * | 4/2000 | Gustafson | 292/307 R |
| 6,515,587 | B2 | 2/2003 | Herbert | |
| 6,963,281 | B2 | 11/2005 | Buckley | |
| 6,995,669 | B2 | 2/2006 | Morales | |
| 7,086,593 | B2 | 8/2006 | Woodard et al. | |
| 7,135,973 | B2 | 11/2006 | Kittel et al. | |
| 7,159,774 | B2 | 1/2007 | Woodard et al. | |
| 7,194,912 | B2 | 3/2007 | Oglesby et al. | |
| 7,278,324 | B2 | 10/2007 | Smits et al. | |
| 2004/0066296 | A1 * | 4/2004 | Atherton | 340/572.1 |
| 2005/0011163 | A1 | 1/2005 | Ehrensvard | |
| 2006/0195705 | A1 | 8/2006 | Ehrensvard et al. | |
| 2006/0250239 | A1 | 11/2006 | Melton | |
| 2007/0069895 | A1 * | 3/2007 | Koh | 340/572.1 |
| 2007/0183110 | A1 | 8/2007 | Woodard et al. | |
| 2007/0210173 | A1 * | 9/2007 | Nagel | 235/492 |
| 2009/0109005 | A1 * | 4/2009 | Woodard et al. | 340/10.4 |

OTHER PUBLICATIONS

U.S. Appl. No. 11/671,089, filed Aug. 9, 2007, Woodard et al.
U.S. Appl. No. 11/856,807, filed Sep. 18, 2007, Woodard et al.

* cited by examiner

*Primary Examiner* — Daniel Hess
*Assistant Examiner* — Matthew Mikels
(74) *Attorney, Agent, or Firm* — Robin W. Edwards

(57) ABSTRACT

A wireless tamper detection sensor is defined by a perforated electrical conductor. The conductor is shaped to form a geometric pattern between first and second ends thereof such that the conductor defines an open-circuit that can store and transfer electrical and magnetic energy. The conductor resonates in the presence of a time-varying magnetic field to generate a harmonic response. The harmonic response changes when the conductor experiences a change in its geometric pattern due to severing of the conductor along at least a portion of the perforations. A magnetic field response recorder is used to wirelessly transmit the time-varying magnetic field and wirelessly detecting the conductor's harmonic response.

25 Claims, 5 Drawing Sheets

WIRELESS TAMPER DETECTION SENSOR AND SENSING SYSTEM

ORIGIN OF THE INVENTION

This invention was made in part by an employee of the United States Government and may be manufactured and used by or for the Government of the United States of America for governmental purposes without the payment of any royalties thereon or therefor.

BACKGROUND OF THE INVENTION

1. Field of the Invention

This invention relates to wireless sensors and sensing systems. More specifically, the invention is a wireless tamper detection sensor and sensing system based on an open-circuit defined by an electrically-conductive two-dimensional geometric pattern having no electrical connections.

2. Description of the Related Art

A variety of package tampering detection systems have been developed in recent years. In general, these various systems are designed to allow a manufacturer, shipper and/or vendor/retailer to detect if a package has been tampered with (e.g., package is opened, contents are removed, and package is resealed to conceal the pilferage) in an effort to determine where there may be a problem in the finished-product shipping and warehousing chain. Most of these systems involve some sort of visual marking (e.g., bar code) or electrically-powered sensor that is attached to a package and read/or interrogated. However, the visual mark systems are relatively easy to defeat by careful cutting and restoring of the bar code. Electrically-powered sensor systems tend to be bulky since an electrical power source must be provided.

U.S. Pat. No. 5,541,577 discloses an electromagnetic asset protection system in which a magnetic strip is applied to a package. The magnetic strip can be interrogated by a hand-held scanner that produces an electromagnetic field near the magnetic strip in order to saturate same. The resulting electromagnetic field emanating from the magnetic strip is then read by the scanner. If the magnetic strip is cut, the response read by the scanner will be different than if the magnetic strip is not cut. However, if the entire magnetic strip is removed and then replaced after the package is opened and resealed, there would be no evidence of tampering.

SUMMARY OF THE INVENTION

Accordingly, it is an object of the present invention to provide a wireless sensor and sensing system that can be used for tamper detection.

Another object of the present invention is to provide a wireless tamper detection sensor and sensing system in which the sensor does not lend itself to being removed and replaced without damage thereto so that tampering is evidenced by such sensor damage.

Another object of the invention is to provide a tamper detection sensor that requires no electrical connections, can be placed inside non-conductive containers, and can be powered and interrogated from a location that is external to the container.

Other objects and advantages of the present invention will become more obvious hereinafter in the specification and drawings.

In accordance with the present invention, a wireless tamper detection sensor is defined by an electrical conductor having first and second ends where the conductor is shaped to form a geometric pattern between the first and second ends such that the conductor defines an open-circuit that can store and transfer electrical and magnetic energy. The conductor further has perforations formed therethrough with electrical conductivity being maintained between the conductor's first and second ends. The conductor resonates in the presence of a time-varying magnetic field to generate a harmonic response. The harmonic response changes when the conductor experiences a change in its geometric pattern due to severing of the conductor along at least a portion of the perforations. A magnetic field response recorder is used to wirelessly transmit the time-varying magnetic field and wirelessly detect the conductor's harmonic response.

DETAILED DESCRIPTION OF THE INVENTION

Figure 1:
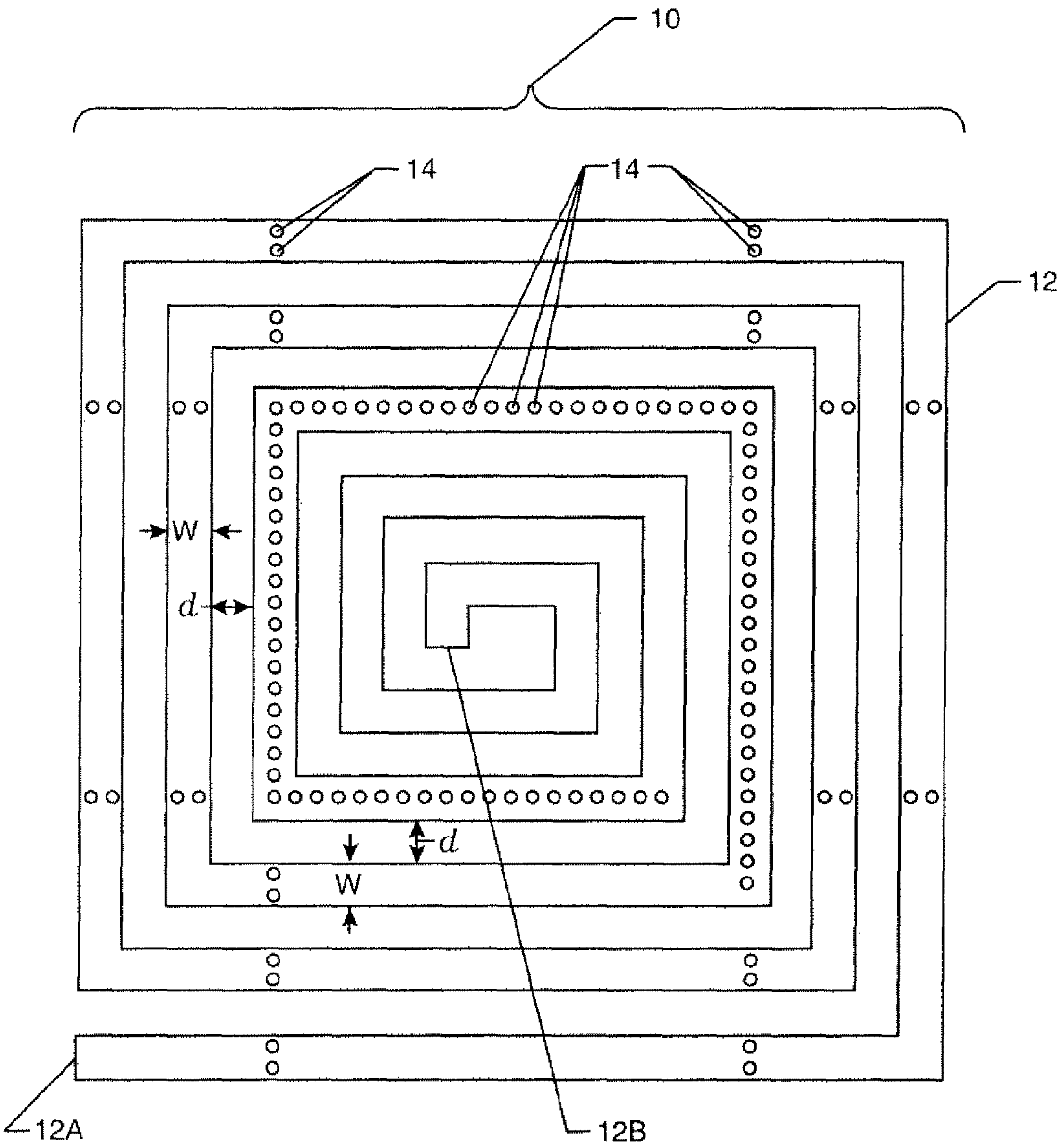
FIG. 1 is a schematic view of a tamper detection sensor in accordance with an embodiment of the present invention.

Referring now to the drawings and more particularly to FIG. 1, a wireless tamper detection sensor in accordance with an embodiment of the present invention is shown and is referenced generally by numeral 10. In this illustrated embodiment, sensor 10 comprises an open-circuit spiral trace sensor 12 with a pattern of perforations 14 formed therethrough. However, it is to be understood that an open-circuit sensor in the present invention can be any electrically-conductive, two-dimensional geometric pattern that can store and transfer electrical and magnetic energy. For the illustrated sensor 12, the trace width and spacing between adjacent trace runs have been exaggerated for purpose of illustration. The same is true for the size of perforations 14. Details of sensor 12 are disclosed in co-pending U.S. patent application Ser. No. 11/671,089, filed Feb. 5, 2007, the contents of which are hereby incorporated by reference in their entirety and are repeated herein to provide a complete description of the present invention.

Spiral trace sensor 12 is made from an electrically-conductive run or trace that can be deposited directly onto a package or other surface (not shown) that is to be monitored for tampering. Sensor 12 could also be deposited onto or within a substrate material (not shown) that is electrically non-conductive and can be flexible to facilitate mounting of sensor 12 to a surface. The particular choice of the substrate materials and substrate construction will vary depending on the application. In addition and as will be explained further below, sensor 12 can also be deposited on any non-electrically conductive surface that is easily torn. If the substrate is one that is easily torn, the sensor perforations may not be needed.

Sensor 12 is a spiral winding of conductive material with its ends 12A and 12B remaining open or unconnected. Accordingly, sensor 12 is said to be an open-circuit. Techniques used to deposit sensor 12 either directly onto a surface or on/in a substrate material can be any conventional metal deposition process to include thin-film fabrication techniques. In the illustrated embodiment, sensor 12 is constructed to have a uniform trace width throughout (i.e., trace width W is constant) with uniform spacing (i.e., spacing d is constant) between adjacent portions of the spiral trace. However, as will be explained further below, the present invention is not limited to a uniform width conductor spirally wound with uniform spacing.

As is well known and accepted in the art, a spiral inductor is ideally constructed/configured to minimize parasitic capacitance so as not to influence other electrical components that will be electrically coupled thereto. This is typically achieved by increasing the spacing between adjacent conductive portions or runs of the conductive spiral trace. However, in the present invention, sensor 12 is constructed/configured to have a relatively large parasitic capacitance. The capacitance of sensor 12 is operatively coupled with the sensor's inductance such that magnetic and electrical energy can be stored and exchanged by the sensor. Since other geometric patterns of a conductor could also provide such a magnetic/electrical energy storage and exchange, it is to be understood that the present invention could be realized using any such geometrically-patterned conductor and is not limited to a spiral-shaped sensor.

The amount of inductance along any portion of a conductive run of sensor 12 is directly related to the length thereof and inversely related to the width thereof. The amount of capacitance between portions of adjacent conductive runs of sensor 12 is directly related to the length by which the runs overlap each other and is inversely related to the spacing between the adjacent conductive runs. The amount of resistance along any portion of a conductive run of sensor 12 is directly related to the length and inversely related to the width of the portion. Total capacitance, total inductance and total resistance for spiral trace sensor 12 is determined simply by adding these values from the individual portions of sensor 12. The geometries of the various portions of the conductive runs of the sensor can be used to define the sensor's resonant frequency.

Spiral trace sensor 12 with its inductance operatively coupled to its capacitance defines a magnetic field response sensor. In the presence of a time-varying magnetic field, sensor 12 electrically oscillates at a resonant frequency that is dependent upon the capacitance and inductance of sensor 12. This oscillation occurs as the energy is harmonically transferred between the inductive portion of sensor 12 (as magnetic energy) and the capacitive portion of sensor 12 (as electrical energy). In order to be readily detectable, the capacitance, inductance and resistance of sensor 12 and the energy applied to sensor 12 from the external oscillating magnetic field should be such that the amplitude of the sensor's harmonic response is at least 10 dB greater than any ambient noise where such harmonic response is being measured.

To create tamper detection sensor 10, a pattern of perforations 14 is formed through spiral trace sensor 12. The size and/or placement of perforations 14 should be such that electrical conductivity is maintained all along sensor 12, i.e., from end 12A to end 12B. The various straight lines of perforations 14 define pre-disposed severance lines for sensor 12. That is, if sensor 12 (which is attached to a surface) is subjected to a pulling or lifting force, sensor 12 will tend to tear along one or more lines of perforations 14. When this happens, the remaining portion of sensor 12 will produce a harmonic response (in the presence of a time-varying magnetic field) that is different than the harmonic response produced when sensor 12 was intact, i.e., not severed. Accordingly, the pattern of perforations 14 used in the present invention should be such that severance of sensor 12 along one or more lines of perforations 14 will always leave some portion of sensor 12 that will generate a harmonic response when the remaining portion of sensor 12 is exposed to a time-varying magnetic field.

Figure 5:
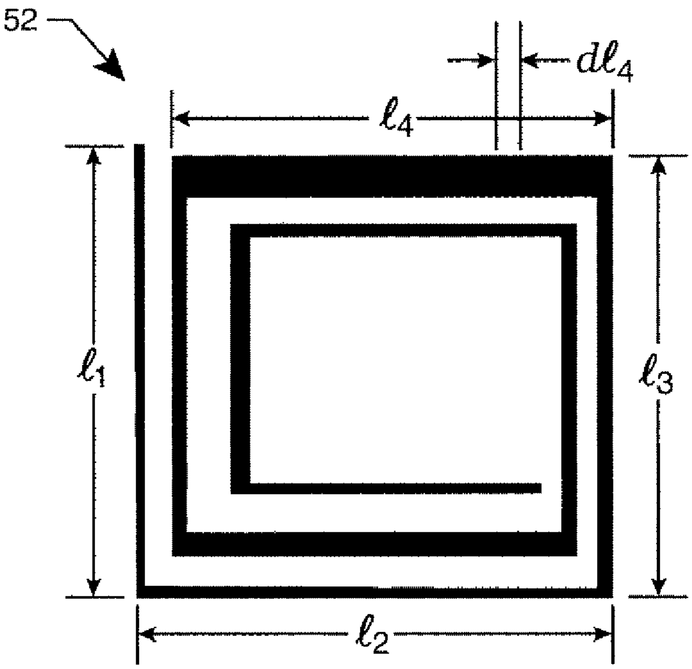
FIG. 5 is a schematic view of a spiral trace sensor whose traces are non-uniform in width.

The manner in which the sensor functions is as follows. The sensor trace is a series of portions with each portion having a length $l_l$ as shown in FIG. 5. The responding magnetic field $B_{RX}(T)$ of the geometric pattern (sensor) at any point in space is due to the combined response of each element $dl_l$ along all the sensor portions $l_l$. Each element $dl_l$ is at a distance r from a point on the receiving antenna. The interrogated response is the result of the responses of all $dl_l$s creating a magnetic flux acting upon the receiving antenna.

When a sensor is electrically excited via Faraday induction at 0° C., the current in the sensor, $I_0$(0° C.), is $$I_0(0^\circ\ \mathrm{C.}) = \frac{\left.\frac{d\Phi_{B_{TX}}}{dt}\right|_{t_0}}{\sqrt{S^2 + R^2(0^\circ\ \mathrm{C.})}} \tag{1}$$

where $$S = \left(\omega L - \frac{1}{\omega C}\right). \tag{2}$$

The inductance and resistance are the sum of the inductance and resistance, respectively, of all sensor portions. The capacitance is the sum of the capacitance from the spacing between the traces. Therefore, for n sensor portions, $$L = \sum_{i=1}^{n} L_i \tag{3}$$

$$R = \sum_{i=1}^{n} R_i \tag{4}$$

$$C = \sum_{i=1}^{n-4} C_i. \tag{5}$$

The magnetic flux $\Phi_{B_{TX}}$ from the external transmitting antenna acting on the sensor is $$\Phi_{B_{TX}} = \int B_{TX} \cdot dS. \tag{6}$$

$B_{TX}$ is a vector whose direction and magnitude are those of the magnetic field from the transmitting antenna. S is a surface vector whose direction is that of the sensor surface normal and whose magnitude is the area of the sensor surface.

In accordance with Faraday's law on induction, the induced electromotive force ε on the sensor is $$\varepsilon = \frac{d\Phi_{B_{TX}}}{dt}. \tag{7}$$

The magnetic field response $B_{RX}(0° \text{ C.})$ at 0° C. produced by the sensor trace at any point in space is $$B_{RX}(0° \text{ C.}) = \left[\frac{\mu}{2\pi}\right]\left[\frac{\left.\frac{d\Phi_{B_{TX}}}{dt}\right|_{t_0}}{\sqrt{S^2 + R^2(0° \text{ C.})}}\right]\sum_{i=1}^{n}\int_{l_i}\frac{dl_i \sin\theta}{r^2}. \tag{8}$$

The sensor response at any point in space is the summation of response of each element $dl_i$ at a distance r from the element. The angle θ is formed by the line from the element to the point in space and the direction of the current flowing through $dl_i$.

The sensor's resistance R is dependent upon temperature T and can be referenced to a baseline resistance $R_0$ by the relationship $$R = R_0(1+\alpha T) \tag{9}$$

where

α=0.00427 and $R_0$=R(0° C.), or more generally $$R_2 = R_1[1 + \alpha_1(T_1 - T_2)] \tag{10}$$

where $$\alpha_1 = \frac{1}{(234.5 + T_1)}. \tag{11}$$

The sensor response $B_{RX}(T)$ at any temperature T in degrees Celsius, in terms of the sensor electrical resistance at 0° C., is $$B_{RX}(T) = \left[\frac{\mu}{4\pi}\right]\left[\frac{\left.\frac{d\Phi_{B_{TX}}}{dt}\right|_{t_0}}{\sqrt{S^2 + (1 + 0.00427T)^2 R^2(0° \text{ C.})}}\right]\sum_{i=1}^{n}\int_{l_i}\frac{dl_i \sin\theta}{r^2}. \tag{12}$$

$B_{RX}(T)$ is dependent upon sensor temperature, resistance at a reference temperature in degrees Celsius, capacitance, inductance, the amount of received magnetic flux, the received magnetic flux rate of change, the physical properties of material in the sensor's electric field such as material dielectric constant or electrical conductivity, the amount of material in the sensor's electric field, the physical properties of material in the sensor's magnetic field such as material permeability or electrical conductivity, and the amount of material in the sensor's magnetic field. The magnitude of one or more multiple unrelated physical properties can be correlated with the sensor response in accordance with Eq. (12). Any temperature could be used to establish a reference. The total sensor response received by the receiving antenna would the sensor's responding magnetic flux and rate of change of the sensor's magnetic flux. The rate of change of the sensor's magnetic flux is that of the sensor's resonant frequency.

If the sensor is broken such that portions $l_k$ through $l_m$ are severed from the pattern, the single sensor of Eq. (12) will result in two concentric inductively coupled sensors whose responses when not inductively coupled are $B_{RX_1}(T)$ and $B_{RX_2}(T)$ with $$B_{RX_1}(T) = \left[\frac{\mu}{4\pi}\right]\left[\frac{\left.\frac{d\Phi_{B_{TX}}}{dt}\right|_{t_0}}{\left(\sqrt{S_1^2 + (1 + 0.00427T)^2 R_1^2(0° \text{ C.})}\right)}\right]\sum_{i=1}^{n}\int_{l_i}\frac{dl_i \sin\theta}{r^2} \tag{13}$$

and $$B_{RX_2}(T) = \left[\frac{\mu}{4\pi}\right]\left[\frac{\left.\frac{d\Phi_{B_{TX}}}{dt}\right|_{t_0}}{\sqrt{S_2^2 + (1 + 0.00427T)^2 R_2^2(0° \text{ C.})}}\right]\sum_{i=m}^{n}\int_{l_i}\frac{dl_i \sin\theta}{r^2} \tag{14}$$

with $$S_1 = \left(\omega L_1 - \frac{1}{\omega C_1}\right) \tag{15}$$

$$L_1 = \sum_{i=1}^{k} L_{1i} \tag{16}$$

$$R_1 = \sum_{i=1}^{k} R_{1i} \tag{17}$$

$$C_1 = \sum_{i=1}^{k-4} C_{1i} \tag{18}$$

and $$S_2 = \left(\omega L_2 - \frac{1}{\omega C_2}\right) \tag{19}$$

$$L_2 = \sum_{i=m}^{n} L_{2i} \tag{20}$$

$$R_2 = \sum_{i=m}^{n} R_{2i} \tag{21}$$

$$C_2 = \sum_{i=m}^{n-4} C_{2i} \tag{22}$$

The subscripts 1*i* and 2*i* index the ith portion of the two inductively coupled sensors, respectively. The resulting response frequency for the two new patterns will each have a higher frequency than the original sensor because each has less inductance and capacitance. Should there be a subsequent severing on any portions along the remaining sensors, that single sensor will result in two concentric sensors in a similar manner.

Figure 2:
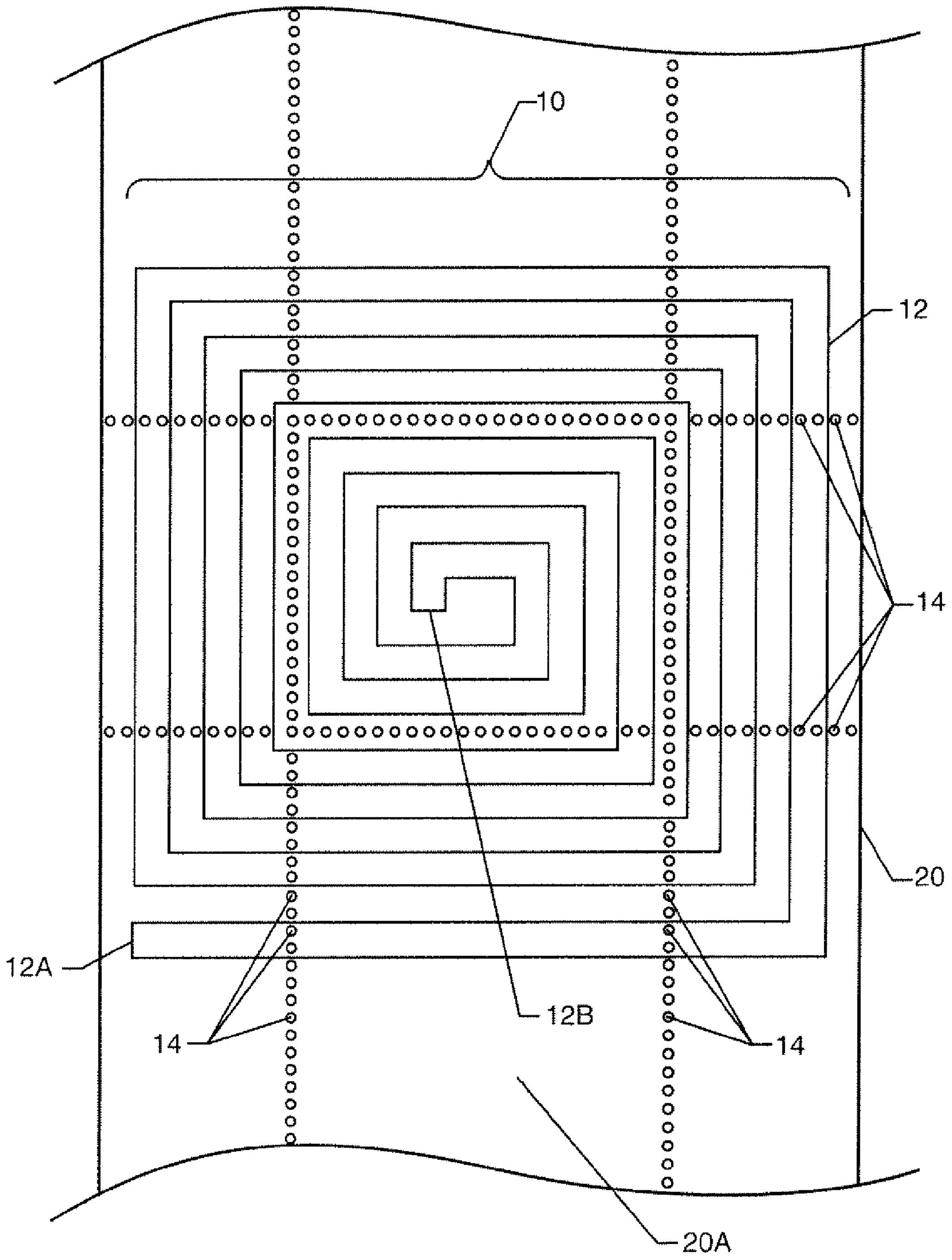
FIG. 2 is a schematic view of a tamper detection sensor mounted on a substrate in accordance with another embodiment of the present invention.

As mentioned above, sensor 12/perforations 14 can be deposited/formed directly on a package or other surface that is to be monitored for tampering. However, the present invention can also be constructed on a substrate with the resulting assembly being attached to a package or other surface. For example, FIG. 2 illustrates tamper detection sensor 10 applied/adhered to the surface 20A of a substrate material 20. If substrate material 20 is one that can be easily torn by hand (e.g., paper such as a paper tape), perforations 14 need only extend through sensor 12 as described above. However, perforations 14 could also extend through substrate material 20 so that sensor 12 and material 20 will be pre-disposed to tear together along one or more lines of perforations 14 when a pulling or lifting force is applied thereto. Perforations 14 could also extend past the confines of sensor 12 (as shown) so that pre-disposed tear lines in substrate material 20 are aligned with those formed in sensor 12. This would be particularly advantageous when substrate material 20 is one that does not easily tear (e.g., plastic or reinforced tape).

In use, substrate material 20 with sensor 12/perforations 14 can be adhered to a package or other surface. The harmonic response of sensor 12 with perforations 14 is measured while sensor 12 is intact. If attempts are made to remove substrate 20, the lifting/pulling force applied thereto will tend to cause sensor 12 to be severed along one or more lines of perforations 14. The severed form of sensor 12 will have a different harmonic response in the presence of a time-varying magnetic field to thereby indicate tampering. Note that if substrate material 20 and sensor 12 are completely removed from a package or surface, interrogation of the surface/package by a magnetic field response recorder would yield no response to also indicate tampering.

Figure 3:
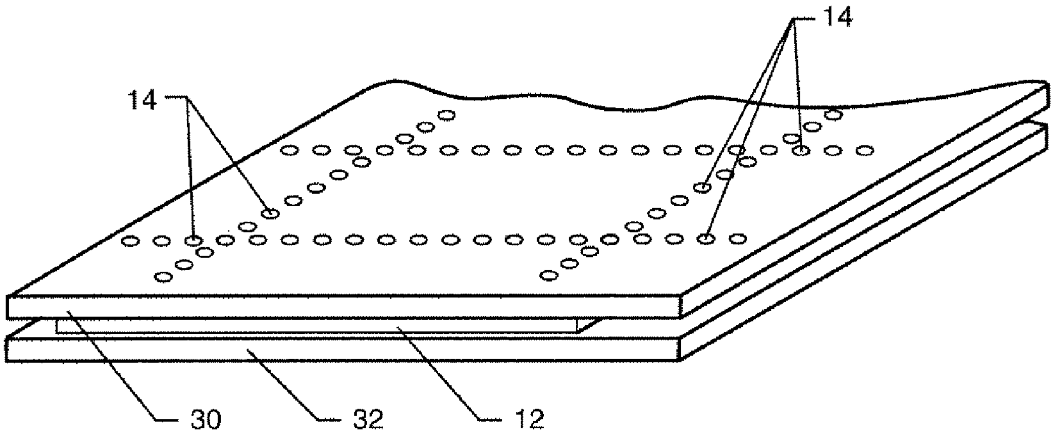
FIG. 3 is a perspective view of a tamper detection sensor mounted between two layers of a substrate in accordance with another embodiment of the present invention.

Sensor 12 could also be disposed or captured between two layers 30 and 32 of a substrate material as illustrated in FIG. 3 where a perspective view of the layered structure is shown. In this embodiment, sensor 12 is hidden from view and is protected by layers 30 and 32. One or both of layers 30 and 32 can be tearable (e.g., paper) or tear-resistant (e.g., plastic, reinforced tape, etc.) without departing from the scope of the present invention. Perforations 14 can be provided through one or both of layers 30/32 and sensor 12 to guarantee the severance of sensor along one or more lines of perforations 14. If both layers 30/32 are made from an easily torn material, it may not be necessary to perforate layers 30 and 32. In such a case, sensor 12 could be "backed" by another substrate (not shown) to form a sub-assembly that could be perforated in accordance with one of the ways described above with reference to FIG. 2. The resulting perforated sensor/substrate sub-assembly could be placed between layers 30/32 such that the sub-assembly would be completely concealed thereby.

Figure 4:
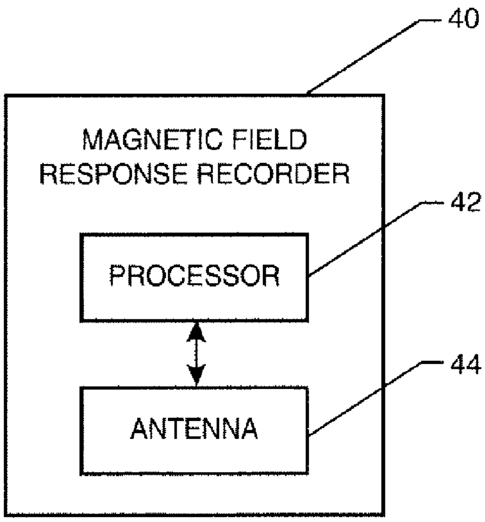
FIG. 4 is a schematic view of an embodiment of a magnetic field response recorder that can be used to interrogate the tamper detection sensor in the present invention.

The application of a time-varying magnetic field to sensor 12 as well as the reading of the induced harmonic response at a resonant frequency is accomplished by a magnetic field response recorder 40 that is illustrated schematically in FIG. 4. The operating principles and construction details of recorder 40 are provided in U.S. Pat. Nos. 7,086,593 and 7,159,774, S. E. Woodard, B. D. Taylor, "Measurement of Multiple Unrelated Physical Quantities Using a Single Magnetic Field Response Sensor," Meas. Sci. Technol. 18 (2007) 1603-1613, and S. E. Woodard, B. D. Taylor, Q. A. Shams, R. L. Fox, "Magnetic Field Response Measurement Acquisition System," NASA Technical Memorandum 2005-213518, the contents of each being hereby incorporated by reference in their entirety. Briefly, magnetic field response recorder 40 includes a processor 42 and a broadband radio frequency (RF) antenna 44 capable of transmitting and receiving RE energy. Processor 42 includes algorithms embodied in software for controlling antenna 44 and for analyzing the RF signals received from the magnetic field response sensor defined by either the intact of severed form of sensor 12. On the transmission side, processor 42 modulates an input signal that is then supplied to antenna 44 so that antenna 44 produces either a broadband time-varying magnetic field or a single harmonic field. On the reception side, antenna 44 receives harmonic magnetic responses produced by sensor 12. Antenna 44 can be realized by two separate antennas or a single antenna that is switched between transmission and reception. For an operational scenario where sensor 12 with perforations 14 is to be read, recorder 40 can be hand-held, mounted on a robot, or mounted to a piece of handling equipment (e.g., conveyor, lift, shelf, etc.) without departing from the scope of the present invention.

Figure 6:
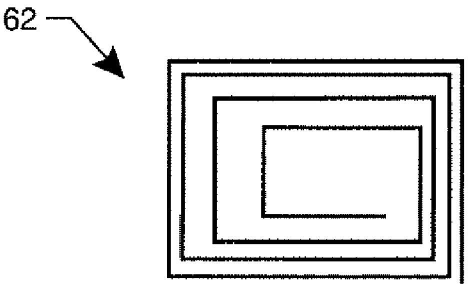
FIG. 6 is a schematic view of a spiral trace sensor having non-uniform spacing between the traces thereof.
Figure 7:
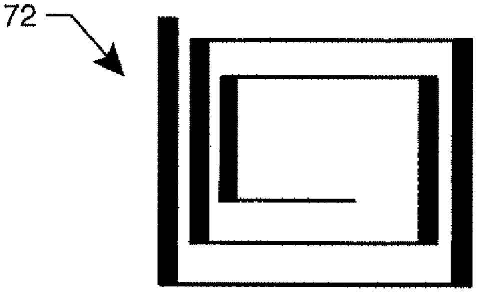
FIG. 7 is a schematic view of a spiral trace sensor having non-uniform trace width and non-uniform trace spacing.

As mentioned above, both the width of the sensor's conductive trace and the spacing between adjacent portions of the conductive trace can be uniform as shown in FIG. 1. However, the present invention is not so limited as will be shown by the following three examples. Perforations are not shown for these three examples to simplify the drawings thereof. FIG. 5 illustrates a sensor 52 in which the width of the conductive trace is non-uniform while the spacing between adjacent portions of the conductive trace is uniform. The length of the outer four portions of the spiral trace are annotated. FIG. 6 illustrates a sensor 62 in which the width of the conductive trace is uniform, but the spacing between adjacent portions of the conductive trace is non-uniform. Finally, FIG. 7 illustrates a sensor 72 having both a non-uniform width conductive trace and non-uniform spacing between adjacent portions of the conductive trace.

As described above, the length/width of the conductive trace and the spacing between adjacent portions of the conductive trace determine the capacitance and inductance (and, therefore, the resonant frequency) of a spiral trace sensor in the present invention. In addition, the sensor's resonant frequency can be modified by providing a dielectric material (i) that resides between adjacent portions of the sensor's conductive trace, or (ii) that encases the sensor's conductive trace, In a similar manner, other electrically conductive geometric patterns that can store both electric and magnetic energy can be tailored geometrically to prescribe a desired frequency.

Figure 8A:
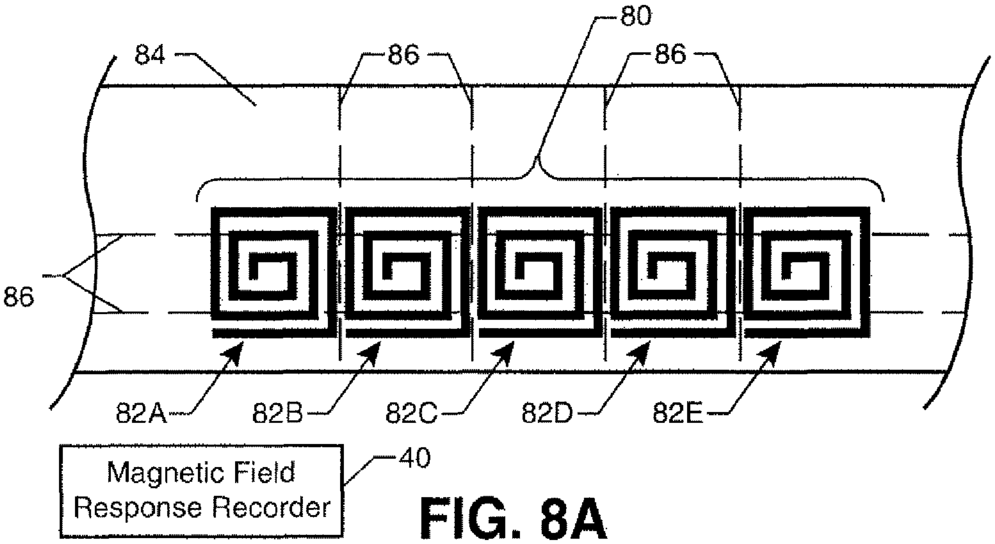
FIG. 8A is a schematic view of a linear arrangement of perforated open-circuit spiral trace sensors that can be mutually inductively coupled and interrogated by a magnetic field response recorder.

Previously-cited U.S. patent application Ser. No. 11/671,089 discusses methods by which an arrangement of open-circuit sensors can be in close enough proximity to one another such that they are inductively coupled to each other. This type of arrangement allows the measurement of each sensor to be interrogated by a magnetic field response recorder without the recorder's magnetic field directly interrogating each sensor. That is, just one sensor can be powered directly by the recorder, and the recorder can directly receive the response (for the whole arrangement) from this sensor. The remaining sensors in the arrangement are communicated with via inductive coupling as their response is superimposed upon that of the sensor being powered and interrogated directly. Hence, the sensor being directly powered/interrogated has a response containing the resonant responses of all sensors in the arrangement that are inductively coupled thereto. Each response can be correlated to the magnitude of one or more physical quantities, In terms of the present invention, this means that any portion of an arrangement of perforated sensors can be interrogated/read wirelessly from one location in the arrangement. For example, a packaging tape incorporating a linear arrangement of sensors in accordance with the present invention could be examined for evidence of tampering anywhere along the tape's length. Two simple sensing arrangements illustrating this concept are shown in FIGS. 8A and 8B.

FIG. 5A illustrates an arrangement 80 of spiral trace sensors 82A-82E all aligned in a row where magnetic field response recorder 40 is positioned to power and receive responses from sensor 82A. Sensors 82A-82E are deposited on a substrate 84 that can be easy or hard to tear without departing from the scope of the present invention. A representative example pattern of perforations in the sensor arrangement that define pre-disposed lines of severance are referenced by dashed lines 86. The pattern of perforations 86 can pass through just sensors 82A-82E or through the sensors and substrate 84. The pattern of perforations 86 can also include lines of perforations passing through just substrate 84 between adjacent ones of sensors 82A-82E as shown. In this way, one or more of sensors 82A-82E could be separated from arrangement 80 and applied to a package or other surface. For example, substrate 84 could be a roll of tape with arrangement 80 arrayed along the length thereof.

Because all sensors 82A-82E are inductively coupled, their response will be superimposed upon the response of an interrogated one of the sensors (e.g., sensor 82A) via inductive coupling. Each sensor is designed so that its frequency does not overlap that of any other sensor. If any sensor in the array should have its response change (as a result of the change in its physical structure) or if any one or more sensors are separated from the arrangement, the change will manifest itself in the response of sensor 82A.

Figure 8B:
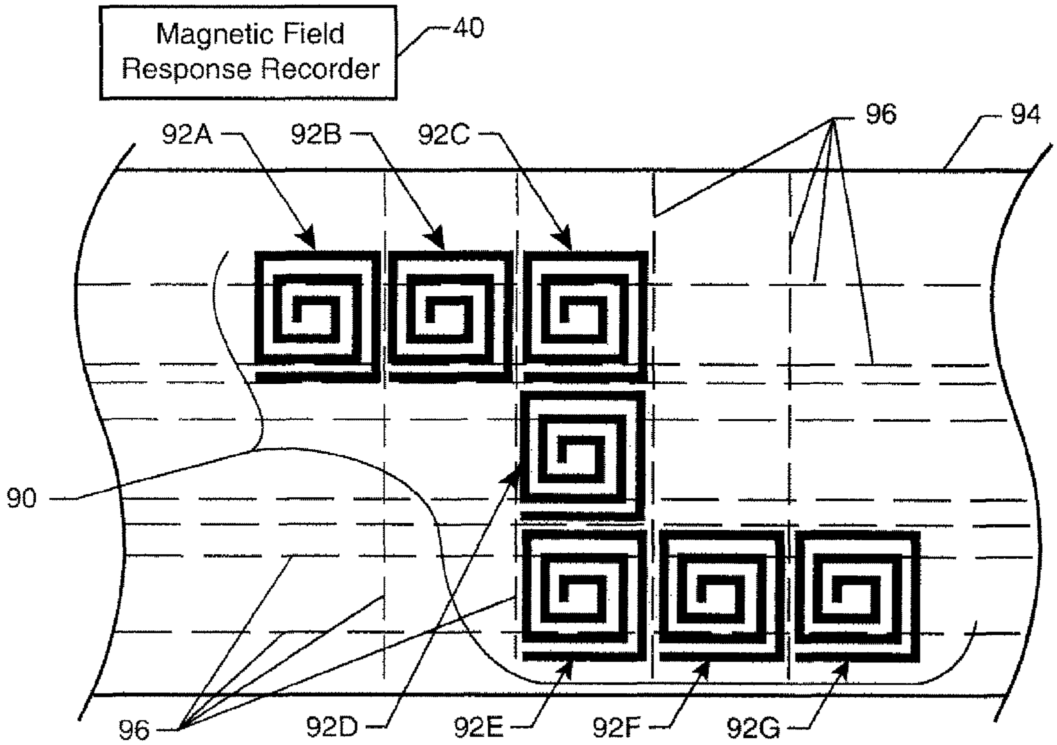
FIG. 8B is a schematic view of a non-linear arrangement of perforated open-circuit spiral trace sensors that can be mutually inductively coupled and interrogated by a magnetic field response recorder.

FIG. 8B illustrates an arrangement 90 of spiral trace sensors 92A-92G not aligned in a row where magnetic field response recorder 40 is positioned to power and receive responses from sensor 92A. Once again, sensors 92A-92G are deposited on a substrate 94 that can be easy or hard to tear without departing from the scope of the present invention. A representative example pattern of perforations in the sensor arrangement that define pre-disposed lines of severance are referenced by dashed lines 96. The pattern of perforations 96 can pass through just sensors 92A-92G or through the sensors and substrate 94. The pattern of perforations 96 can also include lines of perforations passing through just substrate 94 between adjacent ones of sensors 92A-92G as shown. Because all the sensors are inductively coupled, their response will be superimposed upon the response of sensor 92A via inductive coupling. That is, the previously described approach of powering/interrogating an arrangement of sensors via inductive coupling does not require that the sensors be aligned in any particular arrangement. The only requirement for interrogating the sensors via inductive coupling is that the relative positions of the sensors remain fixed.

The advantages of the present invention are numerous. One or more geometric-patterned and perforated open-circuit sensors provide evidence of tampering if one or more of the sensors are torn along the perforations to thereby sever a portion of the open-circuit sensor. The sensors are wirelessly powered and read by a magnetic field response recorder. The conducting portion of the sensor can be made from a lightweight conductive trace that can be readily incorporated into a substrate such as packaging tape.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed is:

1. A wireless tamper detection sensor, comprising:

at least one electrical conductor having first and second unconnected ends and shaped to form a geometric pattern between said first and second unconnected ends;

each said conductor in said geometric pattern maintained as an unconnected open-circuit that can store and transfer electrical and magnetic energy;

each said conductor further having perforations formed therethrough wherein electrical conductivity is maintained between said first and second unconnected ends thereof;

each said conductor resonating in the presence of a time-varying magnetic field to generate a harmonic response, wherein said harmonic response changes when said conductor experiences a change in said geometric pattern due to severing of said conductor along at least a portion of said perforations.

2. A wireless tamper detection sensor as in claim 1, wherein each said conductor comprises a thin-film trace defining said geometric pattern, further wherein the width of said trace is selected from the group consisting of uniform and non-uniform and the spacing between adjacent portions of said trace is selected from the group consisting of uniform and non-uniform.

3. A wireless tamper detection sensor as in claim 1, wherein said geometric pattern is a spiral.

4. A wireless tamper detection sensor as in claim 1, further comprising a tearable material to which each said conductor with said perforations is coupled.

5. A wireless tamper detection sensor as in claim 4, wherein said tearable material is perforated in correspondence with said perforations in each said conductor.

6. A wireless tamper detection sensor as in claim 1, further comprising a substrate material to which each said conductor with said perforations is coupled, said substrate material being perforated in correspondence with said perforations in each said conductor.

7. A wireless tamper detection sensor as in claim 1, further comprising two layers of tearable materials wherein each said conductor with said perforations is disposed between said two layers.

8. A wireless tamper detection sensor as in claim 7, wherein said two layers are perforated in correspondence with said perforations in each said conductor.

9. A wireless tamper detection sensor as in claim 1, further comprising a layered substrate wherein each said conductor with said perforations is disposed between two layers of said layered substrate and wherein said layered substrate is perforated in correspondence with said perforations in each said conductor.

10. A wireless tamper detection sensor as in claim 1, further comprising a magnetic field response recorder for wirelessly transmitting said time-varying magnetic field and for wirelessly detecting each said harmonic response.

11. A wireless tamper detection sensor, comprising:

an electrical conductor having first and second unconnected ends and shaped to form a geometric pattern between said first and second unconnected ends, said conductor in said geometric pattern maintained as an unconnected open-circuit that can store and transfer electrical and magnetic energy; and a pattern of perforations formed through said conductor wherein electrical conductivity is maintained between said first and second unconnected ends thereof:

said conductor resonating in the presence of a time-varying magnetic field to generate (i) a first harmonic response when said pattern of perforations remains intact wherein said first harmonic response has a first frequency, amplitude and bandwidth associated therewith, and (ii) a second harmonic response when said conductor has been severed along a portion of said pattern of perforations wherein said second harmonic response has a second frequency, amplitude and bandwidth associated therewith that is different than said first frequency, amplitude and bandwidth, respectively.

12. A wireless tamper detection sensor as in claim 11, wherein said conductor comprises a thin-film trace defining said geometric pattern, further wherein the width of said trace is selected from the group consisting of uniform and non-uniform and the spacing between adjacent portions of said trace is selected from the group consisting of uniform and non-uniform.

13. A wireless tamper detection sensor as in claim 11, wherein said geometric pattern is a spiral.

14. A wireless tamper detection sensor as in claim 11, further comprising a tearable material to which said conductor with said pattern of perforations is coupled.

15. A wireless tamper detection sensor as in claim 14, wherein said tearable material is perforated in correspondence with said pattern perforations.

16. A wireless tamper detection sensor as in claim 11, further comprising a substrate material to which said conductor with said pattern of perforations is coupled, said substrate material being perforated in correspondence with said pattern of perforations.

17. A wireless tamper detection sensor as in claim 11, further comprising two layers of tearable materials wherein said conductor with said pattern of perforations is disposed between said two layers.

18. A wireless tamper detection sensor as in claim 17, wherein said two layers are perforated in correspondence with said perforations in said conductor.

19. A wireless tamper detection sensor as in claim 11, further comprising a layered substrate wherein said conductor with said perforations is disposed between two layers of said layered substrate and wherein said layered substrate is perforated in correspondence with said perfbrations in said conductor.

20. A wireless tamper detection sensing system, comprising:

at least one electrical conductor having first and second unconnected ends and shaped to form a geometric pattern between said first and second unconnected ends;

each said conductor in said geometric pattern maintained as an unconnected open-circuit that can store and transfer electrical and magnetic energy;

each said conductor further having perforations formed therethrough wherein electrical conductivity is maintained between said first and second unconnected ends thereof;

each said conductor resonating in the presence of a time-varying magnetic field to generate a harmonic response, wherein said harmonic response changes when said conductor experiences a change in said geometric pattern due to severing of said conductor along at least a portion of said perforations; and a magnetic field response recorder for wirelessly transmitting said time-varying magnetic field and for wirelessly detecting each said harmonic response.

21. Sensing tape, comprising:

at least one electrical conductor having first and second unconnected ends and shaped to form a geometric pattern between said first and second unconnected ends;

each said conductor in said geometric pattern maintained as an unconnected open-circuit that can store and transfer electrical and magnetic energy;

each said conductor further having perforations formed therethrough wherein electrical conductivity is maintained between said first and second unconnected ends thereof:

each said conductor resonating in the presence of a time-varying magnetic field to generate a harmonic response, wherein said harmonic response changes when said conductor experiences a change in said geometric pattern due to severing of said conductor along at least a portion of said perforations;

a substrate material, comprising a first surface and a second surface, wherein each said conductor with said perforations is coupled to said first surface and an adhesive is coupled to said second surface.

22. The sensing tape as in claim 21, wherein said substrate material is perforated.

23. The sensing tape as in claim 22, wherein one or more of said substrate perforations correspond with said perforations in each said conductor.

24. The sensing tape as in claim 21, wherein one or more of said substrate perforations are positioned between adjacent conductors.

25. The sensing tape as in claim 21, wherein said harmonic response is dependent on the (i) temperature, resistance, capacitance, and inductance of said at least one conductor; (ii) the amount of magnetic flux received from an operatively connected magnetic field response recorder; (iii) the rate of change of said magnetic flux; (iv) the physical properties of material in said at least one conductor's electric field; (v) the physical properties of material in said at least one conductor's magnetic field; (vi) the amount of material in said at least one conductor's electric field; and, (vii) the amount of material in said at least one conductor's magnetic field.

* * * * *